COMPANDOR SYSTEM HAVING AN ANALOG SIGNAL CONTROLLED COMPRESSOR AND AN AUXILIARY SIGNAL CONTROLLED EXPANDER

Filed April 12, 1962

3 Sheets-Sheet 1

INVENTOR.
HARRI K. LIGOTKY
BY Alfred C. Hill
AGENT

INVENTOR.
HARRI K. LIGOTKY
BY Alfred C. Hill
AGENT

March 15, 1966 H. K. LIGOTKY 3,241,066

COMPANDOR SYSTEM HAVING AN ANALOG SIGNAL CONTROLLED COMPRESSOR AND AN AUXILIARY SIGNAL CONTROLLED EXPANDER

Filed April 12, 1962 3 Sheets-Sheet 3

INVENTOR.
HARRI K. LIGOTKY
BY Alfred C. Hill
AGENT

United States Patent Office 3,241,066

Patented Mar. 15, 1966

3,241,066
COMPANDOR SYSTEM HAVING AN ANALOG SIGNAL CONTROLLED COMPRESSOR AND AN AUXILIARY SIGNAL CONTROLLED EXPANDER

Harri K. Ligotky, Raleigh, N.C., assignor to International Telephone and Telegraph Corporation, Nutley, N.J., a corporation of Maryland Filed Apr. 12, 1962, Ser. No. 187,073
18 Claims. (Cl. 325—30)

This invention relates to compandors and more particularly to a compandor employing an auxiliary signal to control the gain of a receiver to complement the compression characteristic of the compressor.

Compandor arrangements employed with single or multichannel amplitude modulated systems to reduce noise and crosstalk at the receiving end of the system originating between the compressor and the expander are known in the art. In these prior art compandors, voice or other analog signals are compressed at the compressor by utilizing a variolosser circuit responsive to the analog signal to obtain the desired compression characteristic with respect to a fixed D.C. (direct current) reference voltage. At the receiving end of the system another variolosser unit is arranged to be responsive to the analog signal to complement the compression characteristic at the transmitter to thereby provide a linear system which will reduce cross talk and noise level originating in the transmission medium between the compressor and expander. It has been further proposed to utilize an auxiliary signal to control the gain of the receiver to compensate for level variations occurring in the transmission medium. This is accomplished by inserting or adding an auxiliary signal of constant amplitude and frequency to the compressed signal at the output of the compressor. In the receiver, prior to the expander, the auxiliary signal is separated from the received signal and utilized to control the receiver gain in a manner to overcome variations in the transmission medium.

In each of these systems, as well as in other known compandor arrangements, to complement the compressor characteristic to give an overall system linearity, it is necessary that the characteristics of both the compressor and expander be matched. This matching is achieved in the prior art arrangments by selecting proper components, normally silicon diodes, or, more precisely, the A.C. (alternating current) impedance of silicon diodes as a function of D.C.-currents. This matching of the compressor and expander characteristics by component selection is expensive and results in tracking errors not better than ±3 db (decibel) under all environmental conditions.

Therefore, it is an object of the present invention to provide a compandor which eliminates the component selection of the prior art arrangement resulting in tracking errors (matching of the compressor and expander characteristics) in the order of ±0.5 db under all environmental conditions.

Another object of the present invention is to provide a compandor arrangement utilizing an auxiliary signal having a substantially constant amplitude and at least one of two frequencies to control the gain of the receiver to complement the compression imparted to the signal at the transmitter end of the system.

Still another object of the present invention is the provision of a compandor utilizing an auxiliary signal having one of two frequencies to control the gain of the receiver to complement the compression imparted to the analog signal at the transmitter and to convey intelligence in the form of an "on-off" code where the "on" element of the code is indicated by a first frequency of the two frequencies and the "off" element is indicated by the second frequency of the two frequencies.

A feature of this invention is the provision of a compandor coupled to a source of analog signal comprising a source of auxiliary signal, means coupled to operate on the auxiliary signal and the analog signal in response to the amplitude of the analog signal to control the compression of each of the signals in accordance with a given compression characteristic, and means coupled to the control means responsive to the auxiliary signal for expansion of each of the signals to complement the compression thereof.

Another feature of this invention is the provision of a signaling tone utilized to convey intelligence in the form of an "on-off" code, where the "on" element of the code is indicated by a first frequency of the signaling tone and the "off" element is indicated by the second frequency of the signaling tone, as the auxiliary signal. The signaling tone is separated from the analog signal at the receiver to control the gain of the receiver to complement the compression characteristic imparted to the signals at the transmitter and also to activate a signaling tone utilization device to recover the intelligence conveyed by the signaling tone.

Still another feature of this invention is the provision of a variolosser circuit responsive to the amplitude of the analog signal to control the compression of the analog signal and the auxiliary signal in accordance with the given compression characteristic.

A further feature of this invention is the provision of a variolosser circuit responsive to the amplitude of the analog signal at the output of the variolosser circuit to control the compression of both the analog signal and the auxiliary signal in accordance with the given compression characteristic.

Still a further feature of this invention is the provision of an arrangement coupled to the analog signal source and the auxiliary signal source to modulate a carrier wave with the signals from the sources and a variolosser circuit coupled to the output of the modulation arrangement responsive to the amplitude of the analog signal to control the compression of the modulated carrier wave in accordance with the given compression characteristic.

Still another feature of this invention is the provision of a multichannel amplitude modulated communication system of the frequency multiplex type wherein each of the signal channels include one of the arrangements described hereinabove to impart a given compression to the analog and auxiliary signals at the transmitter and at the receiver an arrangement responsive to the auxiliary signal to control the gain of the receiver to complement the compression imparted to the channel signal.

The above-mentioned and other features and objects of this invention will become more apparent by reference to the following description taken in conjunction with th accompanying drawings, in which.

Figure 1:
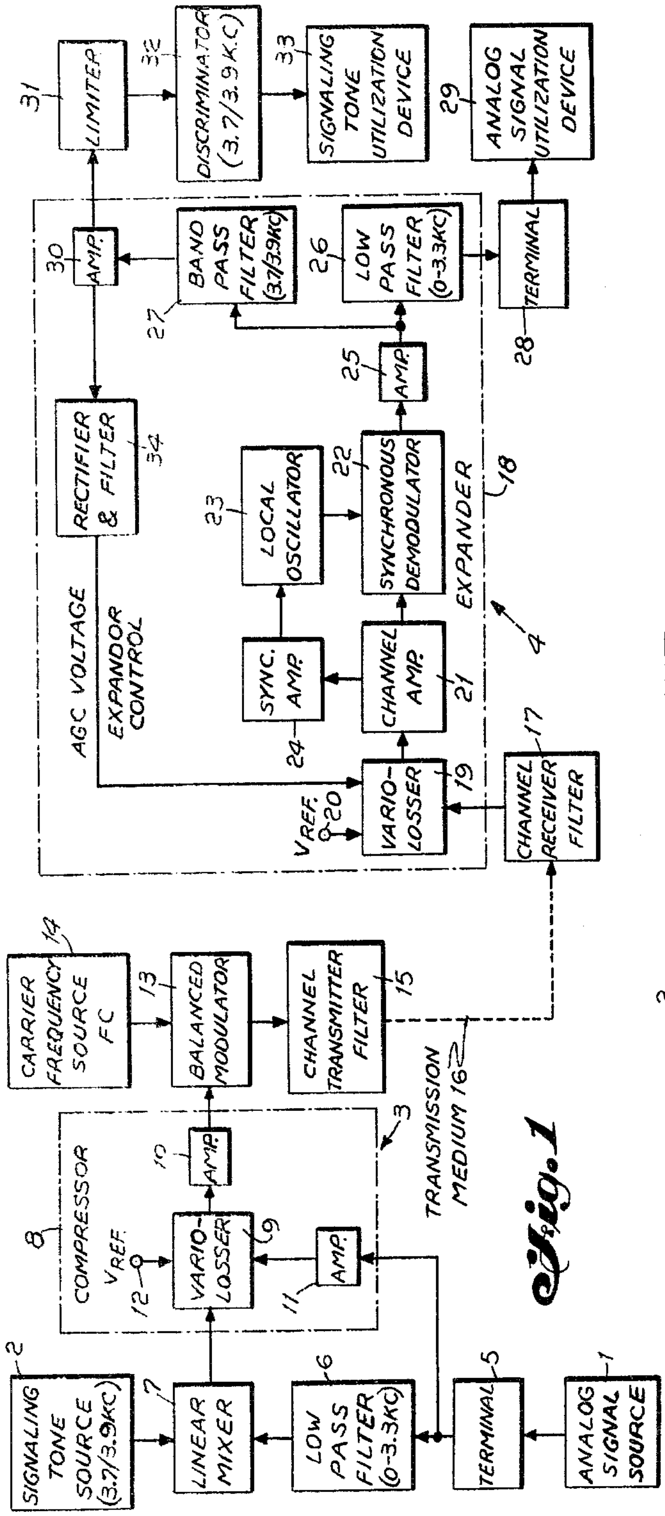
FIG. 1 is a schematic diagram in block form of a single-channel communication system employing a compandor in accordance with the principles of this invention.
Figure 3:
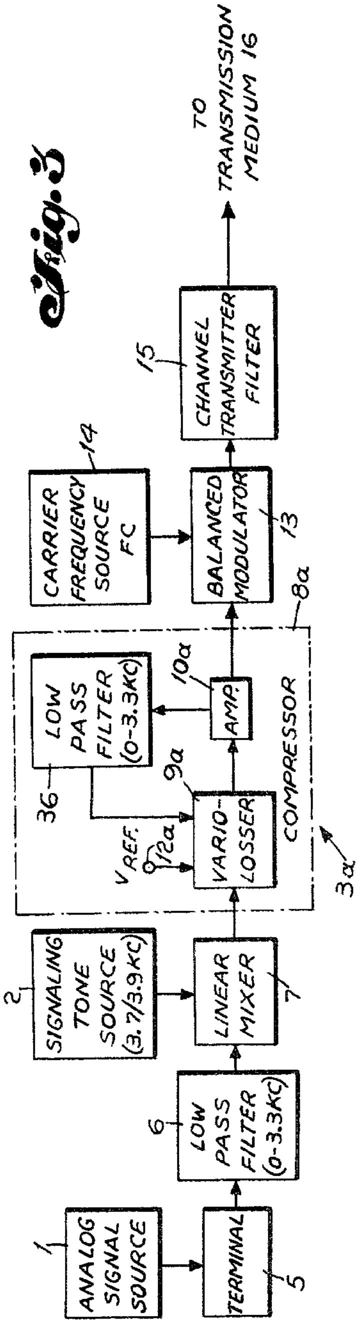
FIG. 3 is a schematic diagram in block form illustrating another embodiment of the compressor arrangement following the principles of this invention.
Figure 4:
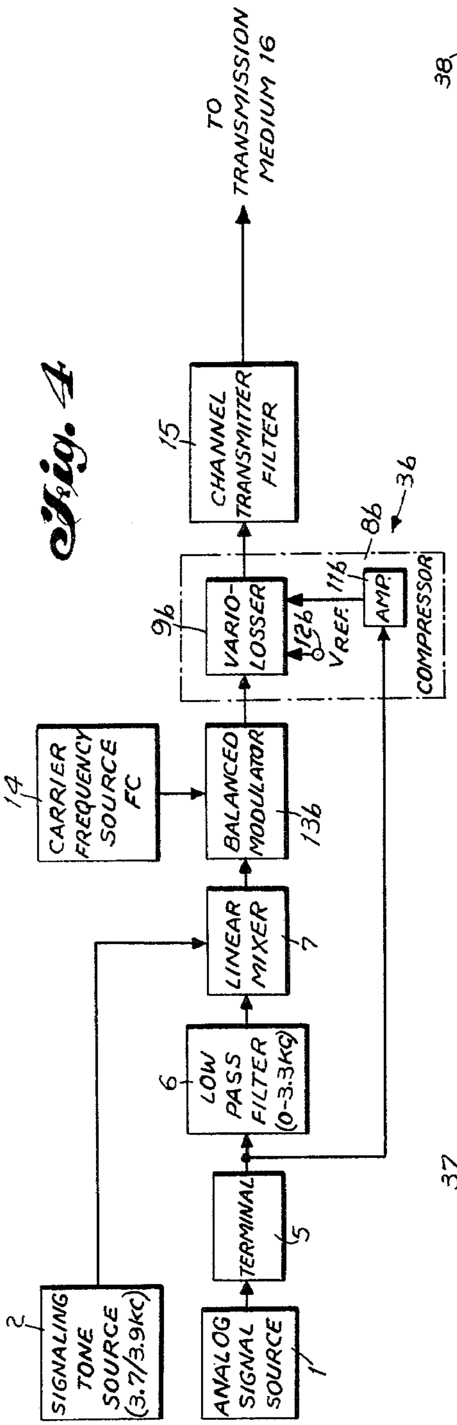
Figure 5:
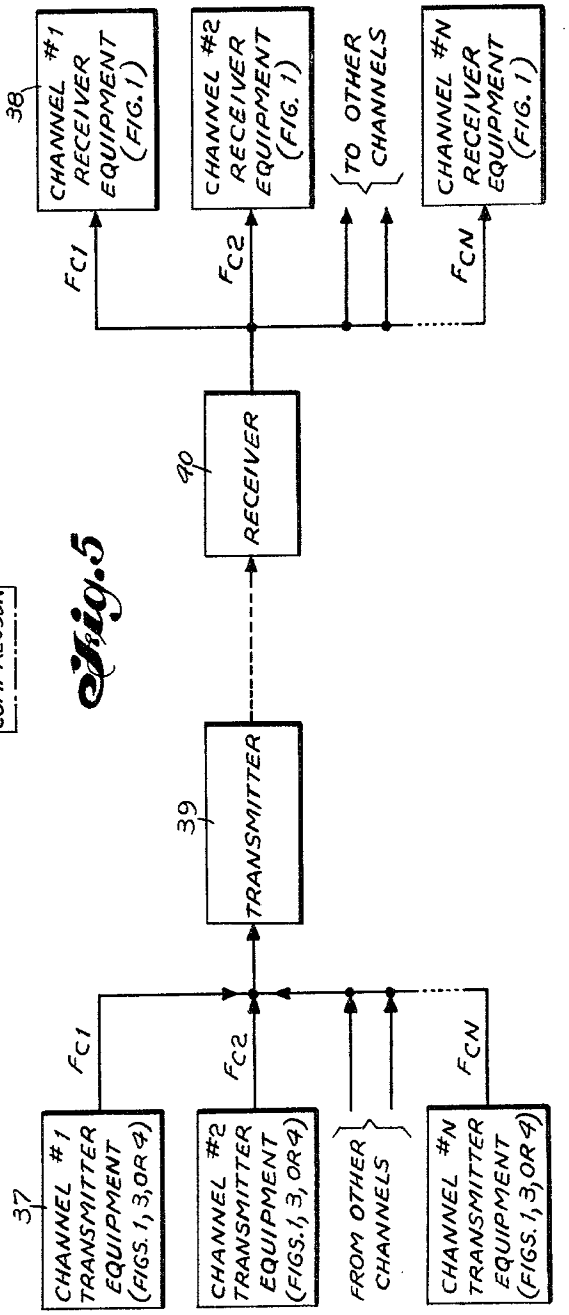

FIG. 4 is a schematic diagram in block form illustrating still another embodiment of the compressor arrangement in accordance with the principles of this invention; and FIG. 5 is a block diagram in schematic form of a multichannel system incorporating in the transmitter of each channel one of the compressors illustrated in FIGS. 1, 3, and 4 and in the receiving equipment of each channel the expander arrangement illustrated in FIG. 1.

Referring to FIG. 1, the compandor of this invention is illustrated in conjunction with a single channel amplitude modulated transmission system. Basically, the compandor of this invention includes a source of analog signal 1 and a source of auxiliary signal 2 which may take the form of a signaling tone capable of generating two fixed frequencies, one at a time, with the resultant frequency signal having a constant amplitude. The signal outputs of sources 1 and 2 are coupled to a control means 3. Control means 3 responds to the analog signal of source 1 to control the compression of the auxiliary signal and the analog signal in accordance with the amplitude of the analog signal to provide a given compression characteristic for both of these signals. The compressed outputs of these two signals are coupled to a means 4 which responds to the amplitude of the auxiliary signal to expand both the analog and the auxiliary signal to complement the compression of these signals in means 3.

Thus, the analog signal, such as voice, and an auxiliary signal having one of two frequencies and a constant amplitude, are applied to the input of means 3 wherein the compression characteristic is controlled by the analog signal only. At the output of means 3 the amplitude of the analog signal and the auxiliary signal varies directly proportional to the gain achieved in means 3 as a function of the analog signal level. Means 4 includes an AGC (automatic gain control) circuit responding to the auxiliary signal amplitude variations only. Since the analog signal and the auxiliary signal coupled to means 4 are compressed directly proportional to the gain of means 3, they need to be expanded inversely proportional to the gain of means 3 in order to give an overall system linearity. The AGC circuit of means 4 does exactly this since this AGC circuit varies the gain of means 4 inversely proportional to the amplitude of the received auxiliary signal. The accuracy of the expansion of the received signals depends upon the sensitivity of the AGC circuit only. Thus, even if the compression characteristic of means 3 is changing, the received auxiliary signals are changing according to the compression characteristic change, thereby effecting the AGC circuit in the proper direction and correcting automatically for maximum linearity (minimum tracking error) of the system. Tracking errors of less than $\pm 0.5$ db are obtainable with this arrangement under all environmental conditions.

More specifically, in accordance with the embodiment of FIG. 1, the analog signal of source 1, such as voice, having a given frequency dynamic range, is fed into terminal 5 providing proper matching and interconnections to the remainder of the equipment. The analog signal output of terminal 5 is coupled to a lowpass filter 6 to limit the frequency band to a given value, for instance, 0–3.3 kc. in the example illustrated, and connects the analog signal to linear mixer (adder) 7. The auxiliary signal, or signaling tone, of source 2 is coupled to the other input of linear mixer 7. The signaling tone of source 2, in the example illustrated, can be operated to provide one of two fixed frequencies to permit the conveyance of intelligence in the form of an "on-off" or "mark-space" type of code, where the "mark" or "on" tone has a frequency 3.7 kc. and the "off" or "space" tone has a frequency of 3.9 kc. By varying the frequency of the signaling tone, in accordance with supervisory or other intelligence, it is possible to convey this intelligence in the form of the "on-off" code to the receiving terminal.

The composite signal including the analog signal and the signaling tone at the output of mixer 7 is coupled to compressor 8 which includes variolosser 9, an output amplifier 10, and a control amplifier 11. A reference D.C. voltage is coupled from terminal 12 to variolosser 9 to fix the so-called focal point, that is, the point at which the insertion loss of compressor 8 is unity. The insertion loss or gain of compressor 8 is controlled by coupling the analog signal at the output of terminal 5 to amplifier 11, and, hence, to variolosser 9 wherein the gain of compressor 8 is controlled by the amplitude of the analog signal. The resultant compressed signal output of variolosser 9, including both the compressed analog signal and compressed signaling tone, are amplified in amplifier 10 and applied to a balanced modulator 13 to modulate the carrier derived from source 14 in accordance with the amplitude of the compressed signaling tone and analog signal. The resultant output of modulator 13 is coupled to channel transmission filter 15 and, hence, over transmission medium 16 which may take the form of cable wire or radio to the input of the channel receiving filter 17.

The output of filter 17 is coupled to means 4 in the form of expander 18. Expander 18 includes variolosser circuit 19 having the D.C. reference potential coupled to terminal 20. The output of variolosser 19 is coupled to channel amplifier 21 and, hence, to a synchronous demodulator 22 which demodulates the received signal through the cooperation of a local carrier generated in oscillator 23 which is synchronized by the received signal modified by sync amplifier 24, in any of a number of known ways. The demodulated output of demodulator 22 is coupled by means of amplifier 25 to filters 26 and 27. Filter 26 is a lowpass filter having, in accordance with the example employed herein, the capability of passing analog signals in the frequency range of 0 to 3.3 kc. to the input of terminal 28 employed for impedance matching purposes and, hence, to an analog signal utilization device 29. Filter 27 is a bandpass filter which will permit the passing of the frequency of the signaling tone and which, in the example employed herein for purposes of explanation, must be capable of passing the frequency 3.7 and 3.9 kc. The output of filter 27 is coupled to amplifier 30 to limiter 31 and, hence, to the tone signaling discriminator 32 for the demodulation of the signaling tone to recover the intelligence carried thereby. The output of discriminator 32 is coupled to the signaling tone utilization device 33. Hence, the signaling tone can be utilized, and is in the illustration presented herein, as a means of conveying intelligence from source 2 to device 33 for supervisory or other purposes needed in connection with communication systems.

Amplifier 30 has a second output which can be connected in common to the output feeding the signaling tone to utilization device 33. The signaling tone passed over this second path is coupled to rectifier and filter 34 to generate a control signal or AGC voltage which is proportional to the amplitude of the signaling tone. This control signal is coupled to variolosser 19 to control the gain of expander 18 and, hence, the gain of the receiver to complement the compression characteristic, as well as variations in the transmission medium 16, to provide the desired automatic correction of the receiver for maximum linearity of the system.

Figure 2:
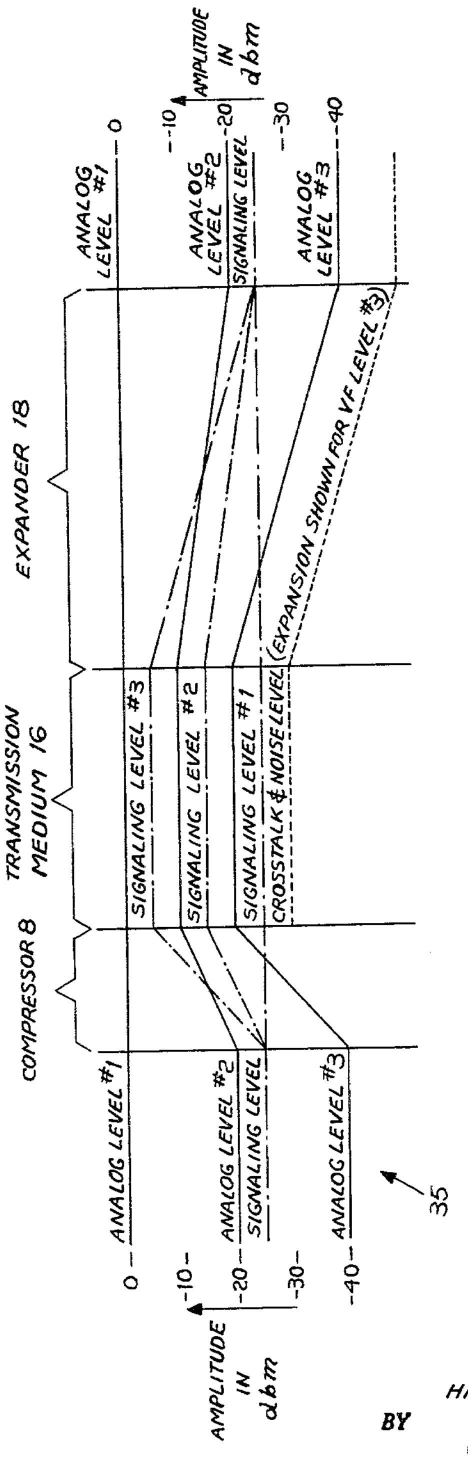
FIG. 2 is a level diagram illustrating the operation of the compandor arrangement of FIG. 1.

Referring to FIG. 2, the level diagram will be utilized to illustrate the action taking place in the compandor system of FIG. 1. For purpose of a clearer representation, the zero reference transmission level, and in this instance the focal point of the compandor, is kept constant at 0 dbm (decibels with reference level of 1 milliwatt) throughout this system. The level diagram illustrates the analog and signaling tone amplitude levels in portion 35 prior to coupling the signals to the input of compressor 8. Considering the analog amplitude level No. 2 having a value of −20 dbm, it is seen that the compressor increases the amplitude of the analog signal by 10 db and likewise increases the amplitude of the signaling tone by a like amount of 10 db at the output of compressor 8. It will also be observed that the analog signal to signaling tone amplitude ratio is maintained constant from the input of compressor 8 to the output thereof. These signals, at the output of compressor 8, are coupled through transmission medium 16 to the input of expander 18. In accordance with the level diagram of FIG. 2, signaling level No. 2 has a value of −15 db which acts to decrease the gain of expander 18 by 10 db giving the original levels for the analog level No. 2, as well as the signaling tone, which, thusly, provides linearity of the system. The signaling tone reference level is controlled by the D.C. reference voltage coupled to terminal 20 to bias variolosser 19 and, in the illustration of FIG. 2, is −25 dbm. Thus, signaling tone input levels above this reference level decrease the expander gain while amplitude levels below this reference level increase the gain, thereby always resulting in an expander characteristic properly matched to the compressor characteristic.

Referring to FIG. 3, there is illustrated therein another embodiment of the compressor 8 which could be utilized in conjunction with the expander 18 of FIG. 1 in place of the compressor illustrated therein.

Components in FIG. 3 substantially identical in structure and function to the corresponding components in FIG. 1 are identified by the same reference characters as employed in FIG. 1. Components in FIG. 3 which are modifications of the corresponding components of FIG. 1 are identified by the same reference characters as employed in FIG. 1 but with a subscript "*a*." As in the transmitting arrangement of FIG. 1, the transmitting arrangement of FIG. 3 includes an analog signal source 1 and a signaling tone source 2 coupled to the input of compressor 8*a*. The analog signal is passed through terminal 5 and lowpass filter 6 to linear mixer 7 wherein the signaling tone of source 2 is added to the analog signal of source 1. The composite signal output of mixer 7 is coupled to variolosser 9*a* and, hence, to an amplifier 10*a* forming a portion of compressor 8*a*. The control signal for variolosser 9*a* is derived in the embodiment of FIG. 3 from the output of amplifier 10*a* by passing the amplified signal through lowpass filter 36 having, for instance, in the illustration employed herein a frequency passband of 0–3.3 kc. The output of filter 36 is the control signal which is coupled to the control input of variolosser 9*a* to control the gain of the signal applied to compressor 8*a* in accordance with the amplitude of the analog signal. The resultant output of compressor 8*a*, as in the case of the embodiment of FIG. 1, is coupled to balanced modulator 13 to modulate the signal from source 14 with the output of compressor 8*a*. This amplitude modulated output is then coupled through filter 15 and, hence, to transmission medium 16 to a receiver including expander 18 as illustrated in FIG. 1.

The difference between the embodiments of FIGS. 1 and 3 is the point at which the control voltage is removed from the signal path to control the variolosser contained in the compressor. In the embodiment of FIG. 1, the output of terminal 5 had a small portion of the analog signal removed therefrom to control variolosser 9 while in the embodiment of FIG. 3, the output of variolosser 9*a* is passed through a lowpass filter to extract the analog signal from the combined analog and signaling tone output of variolosser 9 to provide the analog signal control voltage for variolosser 9*a*.

Referring to FIG. 4, still another embodiment of the transmitting portion of the compandor is accordance with this invention is illustrated. Here again the components similar to the components in both structure and function as shown in FIG. 1 are identified by the same reference characters while modifications of those components illustrated in FIG. 1 are identified by the same reference character with a subscript "*b*." As illustrated, the signal of source 1 is coupled through terminal 5 to lowpass filter 6 and, hence, to linear mixer 7. The output of source 2 is added to the analog signal in mixer 7. The resultant composite signal, including the signaling tone and the analog signal, is coupled to balanced modulator 13*b* to amplitude modulate the carrier of source 14. The amplitude modulated output of modulator 13 is coupled to compressor 8*b*. Compressor 8*b* includes variolosser 9*b* whose gain is controlled relative to the reference potential at terminal 12*b* by the analog signal output of terminal 5 which is coupled to variolosser 9*b* by means of amplifier 11*b*. The compressed signal at the output of variolosser 9*b* is then coupled to channel filter 15 and, hence, to transmission medium 16 for propagation to receiver equipment as illustrated in FIG. 1.

As previously mentioned, the compandor arrangements described with reference to FIG. 1, 3 and 4 are for a single channel amplitude modulated signaling system. It was further mentioned that the compandor arrangement of this invention could be employed in a multichannel communication system. While the multiplexing may be accomplished by other means, the illustration of FIG. 5 demonstrates how the equipment described in FIG. 1 with its modifications, as illustrated in FIGS. 3 and 4, can be employed in a frequency multiplex communication system. Each channel would include its own transmitting equipment 37 following the teachings of FIGS. 1, 3, or 4 and its own receiving equipment 38 following the teachings of FIG. 1. The output of each channel equipment 37 would be coupled to transmitter 39 for transmission to receiver 40 by means of a radio or wire propagation. Receiver 40 would include some means, such as an appropriately designed filter 17, FIG. 1, for each channel to separate the received channel signals for application to their appropriate receiving equipment 38. To provide the frequency separation of the various channel signals the frequency of the carrier of source 14, FIG. 1, would be adjusted in each channel to provide sufficient frequency separation to carry the intelligence band, for instance 0–3.3 kc., and prevent overlap or crosstalk therebetween. The frequency of oscillator 23, FIG. 1, in each channel equipment must of course be appropriately adjusted to provide demodulation in demodulator 22, FIG. 1. An appropriately designed filter 15, FIG. 1, for each channel will cooperate to maintain the desired frequency separation.

While I have described above the principles of my invention in connection with specific apparatus, it is to be clearly understood that this description is made only by way of example and not as a limitation to the scope of my invention as set forth in the objects thereof and in the accompanying claims.

I claim:

1. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to each of said sources responsive to the amplitude of said signal to control the compression of said signal and said tone according to a given compression characteristic;
means coupled to said control means responsive to the amplitude of said tone for expansion of said signal and said tone to complement the compression thereof; and
means coupled to said tone responsive means for utilization of the intelligence conveyed by said tone.

2. A compandor comprising:
a source of analog signal;
a source of auxiliary signal;
means coupled to each of said sources responsive to the amplitude of said analog signal at the output of said source of analog signal to control the compression characteristic of each of said signals according to a given compression characteristic;
a gain control means;
means to couple said compressed signals to said gain control means;
means coupled to the output of said gain control means responsive to said auxiliary signal to produce a control signal proportional to the amplitude thereof; and
means coupling said control signal back to said gain control means for adjustment of the gain thereof to complement the compression of said signals.

3. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to each of said sources responsive to the amplitude of said signal to control the compression of said signal and said tone according to a given compression characteristic;
a gain control means;
means to couple said compressed signal and said compressed tone to said gain control means;
means coupled to said gain control means responsive to said tone to produce a control signal proportional to the amplitude thereof;
means coupling said control signal to said gain control means for adjustment of the gain thereof to complement the compression of said signal and said tone; and
means coupled to said control signal producing means to utilize the intelligence carried by said tone.

4. A compandor comprising:
a source of analog signal;
a source of auxiliary signal;
a first gain control means;
a first path coupled to both said sources to couple both said signals to said first gain control means;
a second path coupled to said source of analog signal to couple said analog signal to said first gain control means to control, according to the amplitude of said analog signal, the compression of each of said signals on said first path according to a given compression characteristic;
a second gain control means;
means to couple said compressed signals to said second gain control means;
means coupled to the output of said second gain control means responsive to said auxiliary signal to produce a control signal proportional to the amplitude thereof; and
means coupling said control signal back to said second gain control means for adjustment of the gain thereof to complement the compression of said signals.

5. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
a first gain control means coupled to each of said sources responsive to the amplitude of said signal to control the compression of said signal and said tone according to a given compression characteristic;
a second gain control means;
means to couple said compressed signal to said second gain control means;
means coupled to said second gain control means responsive to said tone to produce a control signal proportional to the amplitude thereof;
means coupling said control signal to said second gain control means for adjustment of the gain thereof to complement the compression of said signals and said tone; and
means coupled to said control signal producing means to utilize the intelligence conveyed by said tone.

6. A compandor comprising:
a source of analog signal;
a source of auxiliary signal;

means coupled to each of said sources to add the signals thereof together;
a variolosser circuit coupled to the output of said means to add;
means distinct from said means to add coupled to said source of analog signal to couple said analog signal to said variolosser circuit to control the compression of each of said signals according to a given compression characteristic; and
means coupled to the output of said variolosser circuit responsive to the amplitude of said auxiliary signal for expansion of each of said signals to complement the compression thereof.

7. A compandor circuit comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to each of said sources to add said signal and said tone together;
a variolosser circuit coupled to the output of said means to add;
means coupled to the output of said source of analog signal to couple said analog signal to said variolosser circuit to control the compression of said analog signal and said tone according to a given compression characteristic;
a gain control means;
means to couple said compressed analog signal and said compressed tone to said gain control means;
means coupled to said gain control means responsive to said tone to produce a control signal proportional to the amplitude thereof;
means coupling said control signal to said gain control means for adjustment of the gain thereof to complement the compression of said analog signal and said tone;
a first utilization means coupled to said control signal producing means to utilize the intelligence conveyed by said tone; and
a second utilization means coupled to the output of said gain control means to utilize said analog signal.

8. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to each of said sources to add said analog signal and said tone together to form a composite signal;
a first variolosser circuit coupled to the output of said means to add;
means coupled to the output of said source of analog signal to couple said analog signal to said variolosser circuit to control the compression of said composite signal according to a given compression characteristic;
a second variolosser circuit coupled to the output of said first variolosser circuit;
filter means coupled to the output of said second variolosser circuit to separate said tone and said analog signal from each other;
means coupled to said filter means to utilize said analog signal;
means coupled to said filter means to produce a control signal proportional to the amplitude of said tone;
means coupling said control signal to said second variolosser circuit for adjustment of the gain thereof to complement the compression of said composite signal; and means coupled to said filter means to utilize the intelligence conveyed by said tone.

9. A compandor comprising:
a source of analog signal;
a source of auxiliary signal;
means coupled to the output of each of said sources to add each of said signals together to form a composite signal;
a variolosser circuit coupled to the output of said means to add;
means coupled to the output of said variolosser circuit to produce a control signal proportional to the amplitude of said analog signal;
means to couple said control signal to said variolosser circuit to control the compression of said composite signal according to a given compression characteristic; and
means coupled to the output of said variolosser circuit responsive to the amplitude of said auxiliary signal for expansion of said composite signal to complement the compression thereof.

10. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to the output of each of said sources to add said signal and said tone together to provide a composite signal;
a variolosser circuit coupled to the output of said means to add;
means coupled to the output of said variolosser circuit to produce a first control signal proportional to the amplitude of said analog signal;
means to couple said first control signal to said variolosser circuit to control the compression of said composite signal according to a given compression characteristic;
a gain control means coupled to the output of said variolosser circuit;
means coupled to said gain control means responsive to said tone to produce a second control signal proportional to the amplitude thereof;
means coupling said second control signal to said gain control means for adjustment of the gain thereof to complement the compression of said composite signal; and
means coupled to said second control signal producing means to utilize the intelligence conveyed by said tone; and
means coupled to the output of said gain control means to utilize said analog signal.

11. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to the output of each of said sources to add said analog signal and said tone together to form a composite signal;
a first variolosser circuit coupled to the output of said means to add;
means coupled to the output of said variolosser circuit to produce a first control signal proportional to the amplitude of said analog signal;
means to couple said first control signal to said first variolosser circuit to control the compression of said composite signal according to a given compression characteristic;
a second variolosser circuit;
means coupling the output of said first variolosser circuit to the input of said second variolosser circuit;
a first filter means coupled to the output of said second variolosser circuit to separate said analog signal from said composite signal;
means coupled to the output of said first filter means to utilize said analog signal;
a second filter means coupled to the output of said second variolosser circuit to separate said tone from said composite signal;
means coupled to the output of said second filter means to utilize the intelligence conveyed by said tone;
means coupled to the output of said second filter means to produce a second control signal proportional to the amplitude of said tone; and
means to couple said second control signal to said second variolosser circuit to adjust the gain thereof to complement the compression of said composite signal.

12. A compandor comprising:
a source of analog signal;
a source of auxiliary signal;
means coupled to each of said sources to add said signals together to form a composite signal;
means coupled to the output of said means to add to amplitude modulate a carrier wave by said composite signal;
a variolosser circut coupled to the output of said modulation means;
means coupled to the output of said source of analog signal to couple said analog signal to said variolosser circuit to control the compression of said modulated composite signal according to a given compression characteristic in accordance with the amplitude of said analog signal; and
means coupled to the output of said variolosser circuit responsive to the amplitude of said auxilary signal for expansion of said composite signal to complement the compression thereof.

13. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to the output of each of said sources to add said analog signal and said tone together to form a composite signal;
a source of carrier wave;
a modulator coupled to said carrier wave source and the output of said means to add to amplitude modulate said carrier wave in accordance with said composite signal;
a variolosser circuit coupled to the output of said modulator arrangement;
means coupled to the output of said source of analog signal to couple said analog signal to said variolosser circuit to control the compression of said modulated composite signal according to a given compression characteristic in accordance with the amplitude of said analog signal;
a gain control means;
means to couple said modulated compressed signals to said gain control means;
means coupled to said gain control means responsive to said tone to produce a control signal proportional to the amplitude of said tone;
means coupling said control signal to said gain control means for adjustment of the gain thereof to complement the compression of said composite signal;
means coupled to said control signal producing means to utilize the intelligence conveyed by said tone; and
means coupled to the output of said gain control means to utilize said analog signal.

14. A compandor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to the output of each of said sources to add said tone and said analog signal together to form a composite signal;
a carrier wave source;
a modulator coupled to the output of said carrier wave and the output of said means to add to amplitude modulate said carrier wave by said composite signal;
a first variolosser circuit coupled to the output of said modulator;
means coupled to said source of analog signal to couple said analog signal to said first variolosser circuit to control the compression of said modulated composite signal according to a given compression characteristic in accordance with the amplitude of said analog signal;
a second variolosser circuit coupled to the output of said first variolosser circuit;
a first filter means coupled to the output of said second variolosser circuit to separate said analog signal from said composite signal;
means coupled to said first filter means to utilize said analog signal;
a second filter means coupled to the output of said second variolosser circuit to separate said tone from said composite signal;
means coupled to the output of said second filter means to utilize the intelligence conveyed by said tone;
means coupled to the output of said second filter means to produce a control signal proportional to the amplitude of said tone; and
means to couple said control signal to said second variolosser circuit to control the gain thereof to expand said composite signal to complement the compression thereof.

15. A compressor comprising:
a source of analog signal;
a source of signalling tone to convey intelligence in the form of an "on-off" type code, the "on" element of said code being indicated by a first frequency of said tone and the "off" element of said code being indicated by a second frequency of said tone;
means coupled to each of said sources to add the signals thereof together to form a composite signal;
a variolosser circuit coupled to said means to add; and
means coupled to the output of said source of analog signal to couple said analog signal to said variolosser circuit to control the compression of said signal and said tone according to a given compression characteristic.

16. A compressor comprising:
a source of analog signal;
a source of signaling tone to convey intelligence in the form of an "on-off" type code, the "on" element of said code being indicated by a first frequency of said tone and the "off" element of said code being indicated by a second frequency of said tone;
means coupled to each of said sources to add said signal and said tone together to form a composite signal;

means coupled to the output of said means to add to amplitude modulate a carrier wave by said composite signal;
a variolosser circuit coupled to the output of said means to modulate; and
means coupled to the output of said source of analog signal to couple said analog signal to said variolosser circuit to control the compression of said modulated composite signal according to a given compression characteristic in accordance with the amplitude of said analog signal.

17. An expander comprising:
a source of composite signal including an analog signal and a signaling tone to convey intelligence in the form of an "on-off" type code, the "on" element of said code being indicated by a first frequency of said tone and the "off" element of said code being indicated by a second frequency of said tone;
a variolosser circuit coupled to said source;
means coupled to the output of said variolosser circuit to separate said tone from said composite signal;
means coupled to the output of said means to separate to produce a control signal proportional to the amplitude of said tone; and
means coupling said control signal to said variolosser circuit to adjust the gain thereof to control the expansion of said composite signal according to a given expansion characteristic.

18. A multichannel system comprising:
a plurality of signal channels each occupying a different portion of the transmission frequency spectrum; and
each of said signal channels including
  a compandor having
    a source of analog signal,
    a source of signaling tone to convey the intelligence in the form of an "on-off" type code, the "on" element of said code being indicated by a first frequency of said tone and the "off" element of said code being indicated by a second frequency of said tone,
    means coupled to each of said sources responsive to the amplitude of said analog signal at the output of said source of analog signal to control the compression of said signal and said tone according to a given compression characteristic, and
    means coupled to said control means responsive to the amplitude of said tone for expansion of each of said signals to complement the compression thereof.

References Cited by the Examiner

UNITED STATES PATENTS

| | | | |
|---|---|---|---|
| 2,248,757 | 7/1941 | Herold | 333—14 |
| 2,352,918 | 7/1944 | Smith | 179—4 |
| 2,795,650 | 6/1957 | Levine. | |
| 2,912,506 | 11/1959 | Hughes | 333—14 |
| 2,986,712 | 5/1961 | Hochrath | 333—14 |

HERMAN KARL SAALBACH, *Primary Examiner.*